Patented Nov. 11, 1947

2,430,845

UNITED STATES PATENT OFFICE 2,430,845

CYANINE DYES CONTAINING A SULFAMATE ANION

Edmund B. Middleton, Woodbridge, N. J., assignor to E. I. du Pont de Nemours & Company, Wilmington, Del., a corporation of Delaware No Drawing. Application December 9, 1942, Serial No. 468,418

9 Claims. (Cl. 260—240)

This invention relates to new heterocyclic pentavalent salts and to cyanine salts and to their preparation and use and to photosensitive compositions and elements containing such salts. More particularly, it relates to cyanine salts wherein the salt forming components consist of a sulfamate anion and the dyestuff nuclei constitutes the cation portion of the salt and to the preparation and use of the same in photosensitive compositions and elements. A more specific embodiment pertains to photosensitive silver halide colloid compositions, layers and elements containing said salts.

An object of this invention is to provide new and useful cycloammonium salts. Another object is to provide new and useful cyanine salts. A further object is to provide new cyanine salts which while extending the sensitivity of a silver halide emulsion to one region of the spectrum do not reduce the sensitivity of another region of the spectrum. A more specific object is to provide photographic silver halide emulsions which have good sensitivity in the green and red regions of the spectrum without sacrificing blue light speed. Another object is to provide new cyanine salts from available and economical starting materials. Yet another object is to provide cyanine salts which can be incorporated in photographic emulsions from aqueous solutions. Still other objects will be apparent from the following description.

It has been found that cyanine salts wherein the salt forming anion is a sulfamic acid radical and the cation is a cyanine dye nuclei can be prepared by practical and relatively simple manners from cyanine salts or the heterocyclic bases or their cycloammonium salts used in cyanine dye condensations.

The new cyanine salts may be illustrated by the general formula $$R\text{---}X \qquad (1)$$

wherein R is the cation of a cyanine salt and X is the negative radical of a sulfamic acid which is attached to a heterocyclic nitrogen atom in R. The member R, not only includes the heterocyclic nitrogen nucleus and linking chains or radicals of the cyanine dyes, but also the exocyclic hydrocarbon radical attached to heterocyclic nitrogen atom.

A group of mono- and polymethine cyanine sulfamates which are of importance may be represented by the general formula:

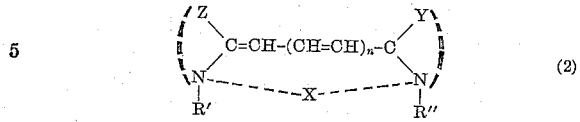

wherein X represents the negative radical of a sulfamic acid, Y and Z represent the same or different atoms necessary to complete a heterocyclic nucleus of the type contained in cyanine dyes, R' and R'' are the same or different monovalent hydrocarbon radicals connected to nitrogen through acyclic carbon, and $n$ is 0 or a small positive integer. R' and R'', for example, may be alkyl radicals, e. g., methyl, ethyl, isopropyl, aralkyl, e. g., benzyl, chlorobenzyl, alkenyl, e. g., allyl, et cetera.

It has been found that cyanine sulfamates can be prepared in a simple and practical manner from cyanine salts by reacting them with a metal sulfamate in a solvent medium. The anion of the cyanine salt should form a more water-insoluble salt than the metal sulfamate used. Cyanine halides and particularly the chlorides and iodides are prepared reactants. The reaction of displacement takes place over a wide range of temperature. In general, temperatures from room to about 100° C. are sufficient. The temperature should be kept below the point at which decomposition of the dyes occurs, however. The formation of the cyanine sulfamates can best be carried out in an organic solvent which is soluble in water such as methanol or ethanol containing a small amount of water.

The reaction is applicable to any type of cyanine dye salt and is not limited to any particular type. The heterocyclic nuclei in the dyes may, for instance, be from substituted or unsubstituted thiazoles, thiazolines, oxazoles, oxazolines, selenazoles, selenazolines, pyridines, quinolines, indolenines, etc. Among the substituents are hydroxyl, alkoxy, e. g., methoxy, ethoxy, methylenedioxy; halogen such as chlorine, bromine; alkyl or cycloalkyl, e. g., methyl, ethyl, cyclohexyl, aryl, e. g., phenyl, chlorophenyl, amino ($NH_2$) and hydrocarbon substituted amino.

The dyes may also be prepared from the sulfamate salts of heterocyclic nitrogen bases of the type used in cyanine dye condensations which contain a reactive group by a dye condensation reaction. Such salts have the general formula:

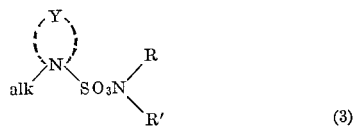

wherein alk is alkyl of 1 to 2 carbon atoms, Y the atoms necessary to complete a heterocyclic nuclei, N is pentavalent, R and R' are hydrogen, methyl or ethyl. The novel sulfamates of Formula 3 can be made by reacting an alkyl cycloammonium salt which contains a reactive group in the alpha or gamma position to the cyclic nitrogen atom with a metal sulfamate. The anion of said cycloammonium salt should form a silver salt more insoluble in the solvent used than silver sulfamate. While cycloammonium salts, in general, can be used which have the above characteristics, the halides are preferred and of these the bromides and iodides are preferred. The temperature, solvents, and other conditions described for the preparation of sulfamate salts from cyanine salts are useful for the preparation of the salts of Formula 3.

The latter salts may then be dye condensed to form cyanine salts having the general Formula 1 by various condensation reactions or they may be condensed with organic compounds to form intermediates with a different reactive group which may be subjected to a dye condensation reaction to form a cyanine dye. Cyanine, including isocyanine and pseudocyanine, neocyanine, etc., dyes can be obtained by reacting an active methyl heterocyclic ammonium sulfamate with amyl nitrite, with an active iodo heterocyclic quaternary salt, or with an alkyl or aryl mercapto quarternary ammonium salt. Carbocyanine dyes are conveniently made by reacting an active alkyl quaternary ammonium sulfamate with an acid anhydride, with an anilido-vinyl heterocyclic ammonium salt, or with a 2-methylene ketone or aldehyde heterocyclic N-alkyl base. Dicarbocyanines can be made by reacting an active alkyl heterocyclic ammonium sulfamate with B-anilino acrolein anil or its derivatives. Tricarbocyanines are easily prepared by reacting an active alkyl heterocyclic ammonium sulfamate with pentadiene dianil or its derivatives so as to increase the chain. Merocyanines are prepared by reacting active methylene heterocyclic compounds with an active methyl quaternary ammonium sulfamate in the presence of an acid binding agent and/or acid anhydride. Styryl dyes are advantageously prepared by reacting an active alkyl quaternary ammonium sulfamate with an active aryl aldehyde.

Symmetrical carbocyanine sulfamates can be conveniently prepared by reaction of one of the above sulfamate salts of heterocyclic nitrogen bases containing a reactive methyl or reactive methylene group in the alpha or gamma position to the heterocyclic nitrogen atom, e. g., alpha-methyl benzothiazole ethyl sulfamate or alpha-methyl quinoline methyl sulfamate with a carboxylic acid ortho ester, e. g., ethyl orthoformate in the presence of an acid binding agent, e. g., a liquid amine such as pyridine, piperidine, dimethylamine, et cetera.

Erythro- and xantho-isocyanines can be prepared by heating a sulfamate salt of quinoline having a reactive methyl group in the alpha position to the heterocyclic nitrogen atom in an alcoholic potassium hydroxide solution, e. g., methyl or ethyl alcohol solution.

Isocyanines can be obtained by condensing a sulfamate salt of a heterocyclic nitrogen base which contains a reactive amino group in the alpha position to the cyclic nitrogen atoms, e. g., alpha amino benzothiazole sulfamate with an alpha-halogen substituted alkyl cycloammonium salt, e. g., alpha-iodoquinoline ethyl sulfamate in the presence of sodium ethoxide.

Carbocyanine dyes may be made by condensing a cyclo ammonium sulfamate salt of a heterocyclic nitrogen base containing a reactive methylene group in the alpha position to the nitrogen atom with compounds of the formula:

wherein W is a group such as halogen, amino, alkoxy, acyl, etc., in the presence of an organic acid anhydride, e. g., acetic anhydride, and following said condensation by reacting the resulting products with a hydrocarbon salt of a quaternary nitrogen compound containing a reactive methyl group in the alpha or gamma position to the nitrogen atom.

Carbocyanine and centrally substituted carbocyanine dyes can be obtained by reacting cycloammonium sulfamates containing a reactive methyl group in the alpha or gamma position with diacylformamidine or a C-alkyl substituted diacylformamidine in the presence of an anhydride, e. g., acetic anhydride, propionic anhydride, and the further reacting of the intermediate thus formed with a heterocyclic quaternary salt having a reactive group, e. g., methylene, methyl, alkylmercapto, halogen, etc., group. The just described dye condensation and the above-described dye condensation reactions are by no means limitative of the invention, but are merely illustrative of the many types of dye condensations which can be used with the novel sulfamate salts having general Formula 3 or derivatives thereof.

In the preparation of photographic emulsions containing such novel dyes, it is necessary only to bring the dye into intimate contact with the light sensitive silver salt layer. This can be accomplished by dispersing the compounds in the emulsions before coating the light sensitive layers or afterwards by bathing or impregnating the layer with the cyanine sulfamates. It is convenient to add the dyes to the emulsions in the form of solutions in appropriate solvents. The solvent must, of course, be compatible with the emulsion, substantially free from any deleterious effect on the light sensitive materials in the emulsions and capable of dissolving the dyes. Methanol, ethanol, acetone, water, etc., are satisfactory solvents for the cyanine sulfamates. The dyes are incorporated in the melted emulsions for uniform distribution.

The concentration of cyanine sulfamates in the emulsions can vary widely, e. g., from about 2 to 100 mg. per liter of ordinary flowable gelatinosilver-halide emulsion. The concentration of dye will vary according to the type of light sensitive materials employed in the emulsion and according to the effects desired. The suitable and most economical concentration for any given emulsion will be apparent to those skilled in the art, upon making ordinary tests and observations customarily employed in the art of emulsion making. To prepare a gelatino-silver-halide emulsion, the following procedure is satisfactory: A quantity of the dye is dissolved in methyl alcohol, ethyl alcohol, or acetone, diluted with water, and a volume of this solution, containing from 2 to 100 mg. of dye, is added to 1000 cc. of a flowable gelatino-silver-halide emulsion with stirring. Stirring is continued until the dye is thoroughly incorporated in the emulsion. Ordinarily from 10 to 40 mgs. of the cyanine sulfamates per liter of emulsion suffice to produce optimum sensitizing effects.

The invention will be further illustrated, but is not intended to be limited by the following examples in which the parts are given by weight:

*Example I.*—Five grams of 3-3′ diethyl 9 methyl thiocarbocyanine iodide were dissolved in 800 cc. of alcohol containing 4 cc. of water. Four grams of silver sulfamate were then added to the solution and the whole was refluxed for 11 hours, cooled, filtered and the product crystallized from the filtrate by partial evaporation and cooling. Four grams of a dye were obtained having a melting point of 187–190° C. and the following structural formula:

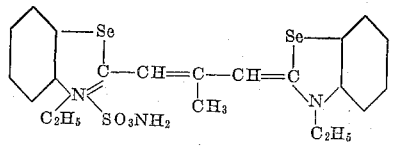

Three hundred and forty-six milligrams of this dye was dissolved in 95% ethyl alcohol and added to 10 kilograms of a gelatino silver halide emulsion containing approximately 60 grams of mixed silver halides (95% silver bromide and 5% silver iodide) and 94 grams of gelatin per liter of emulsion ready for pouring. This emulsion was then coated on film base, chilled, dried, etc., and compared sensitometrically with samples of the same emulsion containing a comparable amount of 3—3′ diethyl 9 methyl thiocarbocyanine iodide. It was found that the blue light speed of the emulsion containing the sulfamate dye was 135 as compared with the speed of the emulsion containing the iodide when this latter speed was taken as 100.

*Example II.*—A sulfamate dye having a melting point of 127° C. was prepared from 6 grams 3:3′ diethyl seleno-carbocyanine iodide and 8 grams of silver sulfamate using the procedure described in Example I. This dye had the structural formula:

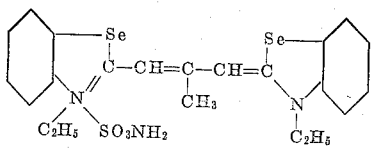

When incorporated in a sample of the photographic emulsion described above which was compared in a similar fashion with a sample of the same emulsion containing an equivalent quantity of the original iodide dye, the sulfamate dye gave a relative blue speed of 138 or a 38% increase in blue light sensitivity.

*Example III.*—A sulfamate dye having a melting point of 187° C. was prepared by refluxing 5 grams of 3:3′ diethyl 5-5′-9-trimethyl thiocarbocyanine iodide with 8 grams of silver sulfamate in an alcoholic solution as described above. When compared sensitometrically with the original iodide dye, the 3:3′-diethyl 5-5′-9 tri-methyl thiocarbocyanine sulfamate which has the following formula:

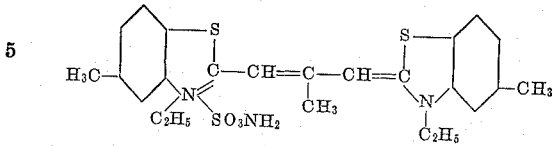

was found to impart a relative blue speed of 121 to the emulsion in which it was placed or a 21% increase in blue light sensitivity over the emulsion sensitized with the iodide sensitizer.

*Example IV.*—A sulfamate dye having a melting point of 209–211° C. and the structural formula:

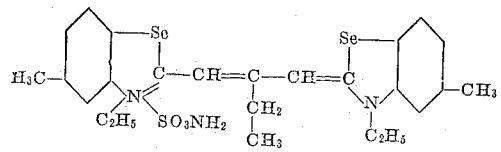

was prepared according to the procedure of Example I from 6 grams of 3-3′-9 triethyl 5-5′ dimethyl selenocarbocyanine iodide and 8 grams of silver sulfamate. When tested in a photographic emulsion as described in Example I it was found to impart a relative blue speed of 120 to the emulsion.

*Example V.*—Thirty and one-half grams of alpha methyl benzothiazole ethiodide and 20.4 grams of silver sulfamate were dissolved in enough 95% ethyl alcohol to dissolve the salts. The mixture was refluxed for 5 hours and the alpha methyl benzothiazole N-ethyl sulfamate formed dissolved in pyridine, filtered while hot through charcoal and allowed to crystallize. The yield was eight grams and the salt had a melting point of 181 to 184° C.

*Example VI.*—Seven and one-half grams of 2-methyl benzothiazole ethyl sulfamate were dissolved in 20 ccs. of dry pyridine and admixed with 7.5 grams of ethyl ortho acetate. The resulting solution was heated under reflux conditions for several hours and a magenta colored solution developed. This dye had the formula:

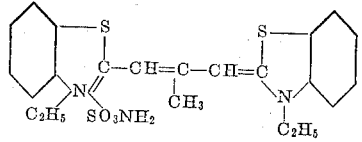

On cooling dye crystals of 3:3′ diethyl-9-methyl thiocarbocyanine sulfamate separated in small yield which were recrystallized from alcohol.

In the above examples the relative blue speeds were calculated from the filter factors as obtained from the D log E curves according to the principle of the method described in Photographic Sensitometry, by L. A. Jones, page 152, Eastman Kodak Company. A sector wheel type sensitometer was used employing a Wratten C–5 filter for the blue exposure and having a light source with a color temperature of 2475° K. All test strips were developed in a metol-hydroquinone-borax developer, fixed, washed and dried, and the filter factors determined graphically at a density of 0.4. The relative blue speed represents the comparative value obtained by taking the reciprocals of the filter factors and assigning the value of 100 in each case to the value obtained from the emulsion containing the iodide salt of the dye. By this means a percentage value is calculated, thus an emulsion containing sulfamate dye and having a relative blue speed of 120 would be 20% faster than the emulsion containing the iodide dye of the same base.

In place of the silver sulfamate of the above examples may be substituted any metal salt of sulfamic acid or an N-alkyl or N-benzyl sulfamic acid which is more insoluble in the solvent used than the compound resulting from the metathetical reaction of its metal ion with the anion of the cycloammonium salt or cyanine salt. Suitable salts include antimony, barium, iron, lead, mercury, and strontium sulfamates and N-methyl, N-ethyl, and N-benzyl sulfamates. Still other salts include silver N-methyl sulfamate, silver N-ethyl sulfamate, silver N-benzyl sulfamate and $AgSO_3NH-C_2H_4NHSO_3Ag$ may be used with cycloammonium halides. With cycloammonium or cyanine chlorates in an alcohol medium one may use potassium sulfamate, whereas with cyanine nitrates one may use in alcoholic solution potassium or ammonium sulfamate. It is thus seen that the process is flexible and different sulfamate salts and solvents may be selected and adapted to many different types of cycloammonium salts, including a wide variety of cyanine salts.

Although only carbocyanine and pseudocyanine dyes have been described in the working examples in exemplification of the preparation of sulfamate dyes from cyanine salts, the invention as has been clearly pointed out above, contemplates the use of other cyanine salts as well. For example, dyes such as the halogenide, e. g., chloride, bromide, and iodide; sulfate, chlorate, nitrate or p-toluene sulfonate salts of erythro- and apo-cyanines, azacyanines, polycarbocyanines such as carbocyanines and tricarbocyanines, styryl dyes, merocyanines, cyadiazines, cyazines and isocyanines can be substituted in like manner and readily be converted into sulfamate salts by reaction with silver sulfamate or another suitable metallic salt of sulfamic acid.

Heterocyclic compounds capable of reacting to form merocyanine type dyes may be employed in condensations with cyclo ammonium sulfamates having a reactive group in the alpha or beta position to the heterocyclic nitrogen atom. Compounds corresponding to the following general formula may be reacted with salts such as that of Example VII:

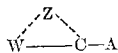

where A is a reactive group capable of entering into cyanine dye condensations. Wherein W is either $=C=S$, $=C=Se$, $=C=Te$, or $=C=O$ and Z represents the non-metallic atoms necessary to complete a five-membered heterocyclic nucleus containing two nuclear non-metallic atoms other than carbon, at least one of which is trivalent nitrogen and another of which is divalent when other than nitrogen, i. e., a thiazolone, an oxazolone, an imidazolone, a pyrazolone, etc., for example, compounds such as rhodanines, a 2-thio-2,4(3,5) oxazoledione nucleus, hydantoins and nitrogen-substituted derivatives, pyrazolones and thiopyrazolones; in addition X represents the non-metallic atoms necessary to complete a six-membered heterocyclic nucleus containing two nuclear trivalent nitrogen atoms and four nuclear carbon atoms such as barbituric acids.

The cyanine sulfamates of this invention are useful in photography, particularly as sensitizing dyes employed to extend the spectral sensitivity of gelatino-silver halide emulsions. The cyanine sulfamates can be used in photographic emulsions containing immobile dyestuff intermediates or color formers for processes of color photography involving color coupling development and/or azo coupling steps. They may, for example, be used with color formers such as phenols, naphthols, naphthylamines, aminonaphthols, and substances which have reactive methylene groups such as acetoacetic acid esters, cyanoacetic acid esters, pyrazolones, coumaranones, etc., which contain high molecular weight groups which lend the color coupling components substantive character with respect to the binding agents of the silver halide emulsion. Such color formers are described in United States Patents 2,179,228, 2,179,238, 2,179,239, 2,186,734, 2,186,849, and 2,108,602.

One of the most important advantages of the invention from the standpoint of photographic utility is that the dyes prepared containing a sulfamate anion impart a higher blue sensitivity to photographic emulsions in which they are incorporated. In the case of panchromatic sensitizing dyes, this is of particular importance because it helps to overcome one serious fault of all of these sensitizing dyes, i. e., the tendency of the panchromatic sensitizing dyes to depress the blue sensitivity of the emulsion. Another important advantage of the invention is that cyanine sensitizing dyes containing sulfamate ion exhibit greatly increased solubility in certain solvents over the dyes previously known to the art. A further advantage may arise from the fact that heterocyclic salts of cycloammonium bases containing a particular anion are sometimes more effective in cyanine dye condensations than those containing other anions.

The term "cyanine salt" as used in this application and claims is intended to connote the cyanine dyes which contain as the cation the cyanine dye nucleus excepting the anion and which have an acid radical as the anion or salt group. The cyanine dyes have the characteristic grouping:

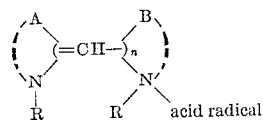

wherein A constitutes the atoms necessary to complete a heterocyclic ring with the tertiary nitrogen atom and B constitutes the atoms necessary to complete a heterocyclic ring with the quaternary nitrogen atom, R is a hydrocarbon radical, e. g., alkyl and aralkyl, and $n$ is 0, 1, 2, 3, etc., (one equivalent of an acid radical and two nitrogen atoms of basic function being joined together by a chain of conjugated double bonds). The acid radical or anion in the cyanine dyes or cyanine salts of this invention is a sulfamic acid radical.

The term "carbocyanine" is intended to connote cyanine dyes of the type just described which contain an acyclic trimethine chain as a part of the conjugated chain between the two nitrogen atoms of basic function.

As many apparently widely different embodiments of this invention may be made without departing from the spirit and scope thereof it is to be understood that the invention is not to be limited except as defined by the appended claims.

I claim:

1. A cyanine salt wherein the anion is the negative radical of a sulfamic acid.
2. A cyanine sulfamate.
3. A cyanine salt wherein the anion is the negative radical of sulfamic acid.
4. An alkyl carbocyanine sulfamate wherein the sulfamic radical resonating between the nitrogren atoms of the terminal nuclei has the formula $NH_2SO_3-$.
5. The process which comprises reacting a cyanine salt with a metal sulfamate in an alcohol medium containing a small amount of water the anion of the cyanine salt forming a more insoluble salt than the metal sulfamate used.
6. The process which comprises reacting an alkyl cyanine halide taken from the group consisting of chlorides, bromides and iodides with a silver sulfamate.
7. The new compound 3,3'-diethyl-9-methyl thiocarbocyanine sulfamate, which has a melting point of 187° to 190° C. and the following structural formula:

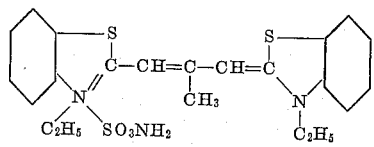

8. The new compound 3,3'-diethyl-selenocarbocyanine sulfamate, which has a melting point of 127° C. and the following structural formula:

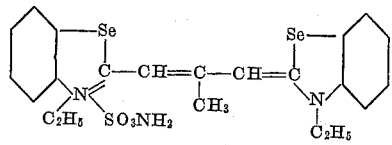

9. The new compound 3,3'-diethyl-5,5,9-trimethyl thiocarbocyanine sulfamate having a melting point of 187° C. and the following structural formula:

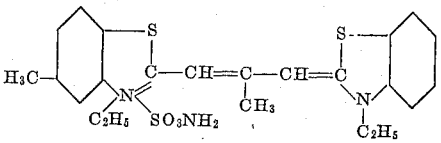

EDMUND B. MIDDLETON.

REFERENCES CITED

The following references are of record in the file of this patent:

UNITED STATES PATENTS

| Number | Name | Date |
|---|---|---|
| 2,165,870 | McQueen | July 11, 1939 |
| 2,172,308 | Gaspar | Sept. 5, 1939 |
| 2,201,762 | Cupery | May 21, 1940 |
| 2,212,171 | Salzberg | Aug. 20, 1940 |
| 2,245,249 | Brooker | June 10, 1941 |
| 2,245,250 | Brooker | June 10, 1941 |

OTHER REFERENCES

Ind. & Eng. Chem., vol. 31, No. 10, p. 1237–8.
Chemical Abstracts, vol. 33, page 9480.

Certificate of Correction

Patent No. 2,430,845. November 11, 1947.

EDMUND B. MIDDLETON

It is hereby certified that errors appear in the printed specification of the above numbered patent requiring correction as follows: Column 2, line 27, for the word "prepared" read *preferred*; column 5, line 27, Example 1, for that portion of the structural formula reading $$\text{``}{-}\underset{|}{\text{Se}}\quad\underset{|}{\text{Se}}{-}\text{''} \quad \text{read} \quad {-}\underset{|}{\text{S}}\quad\underset{|}{\text{S}}{-}$$

and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.*